2,898,214

PROCEDURE FOR PREPARING CANNED RICE

Robert E. Ferrel, Richmond, Calif., assignor to the United States of America as represented by the Secretary of Agriculture No Drawing. Application October 30, 1958
Serial No. 770,892

5 Claims. (Cl. 99—186)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to methods of canning rice and the prime object of the invention is the provision of processes for preparing a canned rice product in which the individual rice grains remain separate and distinct, that is, sticking of the grains to one another and to the walls of the can in which they are packed is essentially eliminated. Further objects and advantages of the invention will be evident to those skilled in the art from the following description wherein parts and percentages are by weight unless otherwise specified.

The successful canning of rice presents several problems. Foremost among these is the problem of stickiness. Under the influence of heat, as required in canning to insure sterility of the product, the rice grains become sticky and gluey so that in aggravated cases the product becomes a gummy, agglomerated mass which is of no practical value. In the Roberts Patent 2,686,130 there is disclosed a process which to a considerable extent obviates the stickiness problem. In accordance with the Roberts patent, white rice is soaked in water then cooked to a limited degree, namely, until the moisture content of the rice is about 45 to 60%. This partially cooked rice is then filled into containers, the containers sealed while under high vacuum, and the sealed cans subjected to a heat processing step to sterilize the containers and contents. Although the Roberts process gives results superior to prior techniques, it is not a complete answer as a substantial degree of sticking is still encountered.

In accordance with the present invention, a canned rice product can be prepared which exhibits less sticking between individual grains and between grains and can walls than can be prepared by the Roberts process. The key step in accordance with the present invention involves coating the rice grains, prior to canning, with an aqueous dispersion of certain organic esters. In this way, the individual grains are each coated with a thin, invisible, tasteless film which effectively prevents the grains from adhering to one another or to the walls of the container in which they are packed.

Prior hereto it has been suggested that edible (glyceride) oils be added to rice to prevent stickiness on canning. This technique yields completely unsatisfactory results. Thus when an edible oil is applied to rice, it does not continuously coat the grains but exists as more or less disconnected droplets on the surface of the grains. This effect is probably due to the incompatibility of the oil, a hydrophobic material, with the hydrophilic material of the rice. At any event, the rice grains are not properly protected from sticking to one another or to the walls of the can. Moreover, such procedure yields a discolored, yellow product. A third disadvantage is that the product is unsightly because of collection of visible oil droplets on the rice and on the container walls. None of these undesirable results are encountered with the process of this invention. Thus the aqueous dispersion of the ester forms a continuous film coating about each rice grain due to compatibility of hydrophilic component of the ester with the hydrophilic surface of the rice. In this continuous coating, the hydrophobic component of the ester is oriented at the external surface of the film. Under these conditions, stickiness is obviated. Moreover, neither discoloration nor formation of unsightly droplets occurs. Although theoretical considerations have been discussed above, the invention is not to be limited thereby. It has been found by actual tests that the coatings in accordance with the invention afford pronounced reduction of stickiness without discoloration or other undesirable side effects whereas addition of oil cannot yield such advantageous results and is totally unsatisfactory.

As noted hereinabove, the objects of the invention are attained by coating the rice, prior to canning, with an aqueous dispersion containing an organic ester. For best results, the following sequence of steps is used: The rice is prepared in a partially cooked state (details on how this may be done are set forth below), the partially cooked rice is coated with the said aqueous dispersion, and the coated, partially cooked rice is placed in cans which are then sealed and sterilized with heat.

The step of coating the rice with the aqueous dispersion of the organic ester may be performed in any of the usual methods generally suitable for coating particulate material with liquids. For example, the rice may be immersed in a pool of the dispersion, then removed and allowed to drain on a screen. In the alternative, the dispersion may be sprayed onto the rice. To attain uniform coating the rice may be tumbled in a rotating drum while contacted with the spray of aqueous dispersion.

The organic esters employed in accordance with the invention are those of the class of polyhydric alcohols partially esterified with higher fatty acids. By partially esterified is meant that not all the hydroxy groups of the polyhydric alcohol are esterified, i.e., one or more hydroxy groups remain as such. Many compounds of this type are known and can be employed in accordance with the invention. The polyhydric alcohol moiety of the ester may be derived from any polyhydric alcohol, by which term is meant the compounds containing at least two alcoholic OH groups. Typical examples of polyhydric alcohols are ethylene glycol, diethylene glycol, triethylene glycol, tetraethylene glycol, hexaethylene glycol, higher polyethylene glycols, glycerol, diglycerol, triglycerol, propylene glycol, pentaerythritol, polyvinyl alcohol, polyallyl alcohol, inositol, glucose, sucrose, fructose, maltose, starch, dextrin, mannitol, sorbitol, and dulcitol. Also contemplated are polyoxyethylene ethers of polyhydric alcohols, the ethers containing at least two OH groups. Such ethers may be prepared by condensing ethylene oxide with any of the polyhydric alcohols listed above. The acid moiety of the esters may be derived from any higher fatty acid, by which term is meant those fatty acids containing at least eight carbon atoms. Typical examples are caprylic acid, capric acid, lauric acid, myristic acid, palmitic acid, oleic acid, linoleic acid, linolenic acid, ricinoleic acid, stearic acid, dihydroxystearic acid, oleostearic acid, erucic acid, and the like.

Typical examples of classes of esters and individual esters which may be used in accordance with the invention are listed below:

Fatty acid monoesters of inner ethers of hexitols. Illustrative of this class are sorbitan monolaurate, sorbitan monomyristate, sorbitan monopalmitate, sorbitan monostearate, sorbitan monooleate. The corresponding fatty acid esters of mannitan may also be used.

Condensation products of ethylene oxide with sorbitan fatty acid esters or mannitan fatty acid esters. Typical among these compounds are polyoxyethylene sorbitan monolaurate, polyoxyethylene sorbitan monomyristate, polyoxyethylene sorbitan monopalmitate, polyoxyethylene sorbitan monostearate, polyoxyethylene sorbitan monooleate, polyoxyethylene sorbitan dilaurate, polyoxyethylene sorbitan dioleate, polyoxyethylene sorbitan oleate-laurate, polyoxyethylene sorbitan trioleate, and the like. These compounds may contain anywhere from 6 to 60 moles of ethylene oxide per mole of sorbitan fatty acid esters.

Condensation products of ethylene oxide with higher fatty acids, that is, compounds of the formula $$RCO-(OC_2H_4)_nOH$$

wherein RCO— is the acyl radical of a higher fatty acid such as lauric, myristic, palmitic, stearic, oleic, etc. and $n$ has a value from 6 to 60.

Mono- or di-esters of sucrose and higher fatty acids. Illustrative compounds of this class are sucrose monolaurate, sucrose monomyristate, sucrose monopalmitate, sucrose monostearate, sucrose monooleate, sucrose dilaurate, sucrose dimyristate, sucrose dipalmitate, sucrose distearate, sucrose dioleate, etc.

Monoglycerides of higher fatty acids, for example, glycerol monolaurate, glycerol monomyristate, glycerol monooleate, etc.

Condensation products of ethylene oxide with mono- or di-glycerides of higher fatty acids, for example, polyoxyethylene glycerol monolaurate, polyoxyethylene glycerol monopalmitate, polyoxyethylene glycerol dioleate, etc.

Fatty acid esters of glycerol-sorbitan (or mannitan) ethers, for example, glycerol sorbitan monolaurate, glycerol mannitan monolaurate, glycerol sorbitan monooleate, glycerol mannitan monooleate, glycerol sorbitan dioleate, etc.

Although all esters of the category described herein are effective to reduce stickiness of canned rices, it is not represented that all of them are equally effective. Generally, optimum results are attained with those esters wherein the hydrophobic-hydrophilic ratio is such that the esters will form stable dispersions in water. A selected ester can be tested for such property by dispersing about 0.5 to 5% of the ester in water with vigorous agitation or homogenizing then allowing the dispersion to stand. A stable dispersion, for the purpose of this invention, is one which will show no phase separation when allowed to stand for one hour or more. The expression dispersion as used herein is inclusive of true solutions, colloidal solutions, emulsions, or suspensions. It is of course within the purview of the invention to employ mixtures of different esters and indeed many of the commercially available partial fatty acid esters of polyhydric alcohols are, in fact, mixtures. The inherent dispersing properties of polyhydric alcohol-fatty acid partial esters may be utilized for preparing stable dispersions for use in accordance with the invention. For example if a selected ester exhibits preponderant hydrophobic properties so it does not form stable dispersions in water, a different ester having more hydrophilic properties may be incorporated therewith to provide a stable dispersion.

In preparing the aqueous dispersion for use in the process of the invention, the selected ester is agitated with water. Heat may be applied where necessary to aid in forming the dispersion. Also, to aid in forming the dispersion one may employ such equipment as high speed mixers, homogenizers, colloid mills, or the like. The proportion of ester may be varied. Generally, dispersions are used containing from about 0.1 to about 10% of ester, based on the weight of the dispersion. A preferred concentration is about 0.5 to 2%. It will be appreciated that the particular ester for use in the process of the invention will be selected according to the use to be made of the final product. Thus where the product is intended for edible purposes, the ester selected will be one which is edible or at least which may be ingested without adverse effects. Thus for the production of edible products I prefer to use esters of the following types: higher fatty acid esters of carbohydrates, particularly sucrose; glycerol monoesters of higher fatty acids; polyoxyethylene derivatives of higher fatty acids, e.g., polyoxyethylene monopalmitate, polyoxyethylene monostearate, etc.; sorbitan-higher fatty acid esters; mannitan-higher fatty acid esters; polyoxyethylene sorbitan-higher fatty acid esters; polyoxyethylene mannitan-higher fatty acid esters; and the like.

Preparation of the rice in a partially cooked state may be accomplished essentially as described in the aforesaid Roberts patent. A suitable amount of white rice is first soaked in water. Usually water at about room temperature is used for convenience although the water may be warmed to accelerate hydration of the grains. Thus the temperature of soaking may be from about 20° C. to about 60° C. Generally the soaking is carried out for about 30–60 minutes, the aim being to increase the moisture content of grains to the equilibrium amount, that is, about 30%. The soaked rice is then subjected to a partial cooking operation by contact with boiling water or steam, the former being preferred. The purpose of this partial cooking is to partially gelatinize the starch in the rice grains so that their moisture content can be increased above the level obtained in the soaking operation. It is critical that the conditions of this cooking operation be restricted so that the grains contain not more than about 45 to 60% water, preferably the grains should contain about 55% water. The duration of cooking will vary depending on such factors as the variety of rice used, the temperature of the cooking medium, etc. For example, with a short-grained rice such as Pearl, a 1 to 2 minute boiling will be adequate whereas with a long-grain rice such as Patna, a 3 to 4 minute boiling will be required. If the cooking is carried out in hot water below the boiling point longer cooking times would be required. In any particular case, pilot operations can be carried out on small samples of the variety in question to determine the time of cooking required to attain a moisture level of 45–60% at the temperature selected for the cooking operation. It is to be observed that at this moisture level the grains are not cooked to an edible state; to get to an edible state a moisture content of 65–75% is required. Thus the partially cooked grains have soft exteriors but their centers are still somewhat hard and raw. In this condition the rice can be subjected to a subsequent heat processing step (required for sterilization) without forming a pasty mass; completely cooked rice under these conditions would form a pasty product of no practical value. If desired, the soaking step may be eliminated and the raw white rice directly cooked in water. In this case it is likewise essential that the grains be cooked only to the point where they contain 45 to 60%, preferably about 55%, of water. The time of cooking will depend on the variety of rice and the temperature of the cooking medium. In general the proper degree of moisture content is attained by boiling the rice about 4 to 10 minutes.

For best results, the water used for soaking and cooking the rice should be neutral or somewhat acidic, thus its pH should be about from 5 to 7. Alkaline waters as encountered in some areas tend to cause a yellowing of the canned rice. Thus it is preferred to check the pH of the water supply. If it exhibits an alkaline reaction, a suitable amount of edible acid is added to bring it to the pH range indicated. Acetic acid or phosphoric acid are preferred for this purpose. For similar reasons, it is preferred that the aqueous dispersion applied to the rice be free from alkalinity. Thus when the dispersion is prepared its pH may be tested and where necessary brought to the above range. For this purpose one may employ any edible acid such as acetic, citric, phosphoric, maleic, tartaric, or the like.

After application of the aqueous dispersion to the partially cooked rice, as described above, the dispersion-coated rice is packed into cans and the cans sealed, preferably under high vacuum, that is, a vacuum of 27 or more inches of mercury. The advantage of sealing under high vacuum whereby to prevent discoloration of the rice is explained in the Roberts patent. After sealing, the cans are subjected to a retorting or autoclaving operation to sterilize the contents and insides of the cans. This operation is carried out in the same manner as is common to all vegetable canning operations and requires that the cans be subjected to steam under superatmospheric pressure for a sufficient period of time to insure destruction of microorganisms and spores. For example with cans up to 3 inches in diameter one may apply a temperature of 240° F. for 60 minutes. In general, temperatures of 220–270° F. applied for times of 30 to 120 minutes may be used depending on the size of the cans.

The canned rice product prepared in accordance with the invention is of superior quality measured by all significant criteria. In color it is brilliant white comparable to best quality freshly cooked rice. In flavor and texture it is virtually indistinguishable from best quality freshly cooked rice. In regard to separation of grains it is superior to best quality freshly cooked rice and superior in this regard to the products produced by the Roberts Patent 2,686,130.

To prepare the canned rice product for the table, the can is opened and the contents immersed in boiling water for not more than one minute, then drained. The rice is then ready to eat; no cooking is required.

The invention is further demonstrated by the following examples.

A series of canned rice products were prepared from a single batch of raw white rice employing the following procedure in each case.

Twelve hundred grams of white rice was soaked for 30 minutes at room temperature in 1000 ml. of water adjusted to a pH of 5–5.5 with acetic acid. The soaked rice was rinsed in tap water, drained, and placed in 3500 ml. of boiling water, the pH of which had been adjusted to 5–5.5 with acetic acid. The rice was cooked on the steam bath for about 5 minutes until its moisture content was 50%. The partially cooked rice was removed from the cooking water and drained. Different lots of partially cooked rice were then coated with aqueous dispersions of different esters, as described below. Each dispersion contained 0.5% of ester, the remainder water. The pH of the dispersions was adjusted to the level 5–5.5 by addition of acetic acid. Coating was accomplished by immersing the partially cooked rice in a bath of 3500 ml. of dispersion, then draining the coated rice on a screen. In a control experiment no coating was applied. The rice was then packed into 303 x 406 enamel-lined cans, using 336 grams rice per can. The cans were sealed under a vacuum of 25″ Hg, retorted 60 min. at 240° F. and cooled in tap water.

All the lots of canned rice were allowed to stand seven days at room temperature. The cans were then opened and the products observed, tasted, and tested for grain separation. The degree of grain separation was determined as follows:

Both ends of the can are removed and the mass of rice pushed out onto the top of a shaker screen. This screen is a metal plate having $3/16''$ holes on $1/4''$ centers in staggered rows. The screen is shaken for 2 minutes on a reciprocating table with a stroke of one inch at a speed of 335 strokes per minute. The rice that passes through the screen is collected and weighed. The degree of grain separation is calculated by dividing this weight by the weight of the rice originally placed in the screen and multiplying by 100 to put it on a percentage basis. It is evident that the higher the degree of grain separation the better the product as the grains exhibit less tendency to stick together.

The esters employed in the coating dispersions and the results obtained are set forth below:

| Example | Ester used in dispersion | Degree of grain separation, percent |
|---|---|---|
| Control | None | 22 |
| 1 | Sorbitan monooleate ("Span 80") | 75 |
| 2 | Polyoxyethylene sorbitan monooleate ("Tween 80") | 54 |
| 3 | Glycerol mannitan laurate ("Atlas NNO") | 54 |
| 4 | Sorbitan monolaurate ("Span 20") | 48 |
| 5 | Polyoxyethylene sorbitan monolaurate ("Tween 20") | 46 |
| 6 | Polyoxyethylene sorbitan monostearate ("Tween 60") | 42 |
| 7 | Glycerol monoricinoleate | 46 |
| 8 | Diethylene glycol monolaurate | 37 |
| 9 | Monolaurate of a polyethylene glycol of mol. wt. about 400 | 36 |

It was also observed that all of the canned rice products were white in color and had a good natural rice flavor. There was no evidence of oiliness or oil droplet formation on the rice grains.

Having thus described my invention, I claim:

1. In the process of canning rice wherein white rice is partially cooked until its moisture content is about from 45 to 60%, the partially cooked rice is filled into containers, the containers are sealed and subjected to a heat processing operation to sterilize the contents and the insides of the containers, the improvement which comprises coating the rice prior to filling it into containers, with a stable aqueous dispersion containing at least about 0.1% by weight of a partial ester of a polyhydric alcohol and a higher fatty acid, whereby the canned product exhibits minimized stickiness.

2. A process for canning white rice which comprises soaking white rice in water, partially cooking the soaked rice until its moisture content is about from 45 to 60%, coating the partially cooked rice with a stable aqueous dispersion containing at least about 0.1% by weight of a water-dispersible partial ester of a polyhydric alcohol and a higher fatty acid, filling the coated, partially cooked rice into containers, sealing the containers under vacuum and subjecting the sealed containers to a heat processing operation to sterilize the contents and insides of the cans.

3. The process of claim 2 wherein the said ester is a sorbitan-higher fatty acid ester.

4. The process of claim 2 wherein the said ester is a polyoxyethylene sorbitan-higher fatty acid ester.

5. The process of claim 2 wherein the said ester is sorbitan monooleate.

References Cited in the file of this patent

UNITED STATES PATENTS 2,686,130    Roberts    Aug. 10, 1954